US010095986B2

(12) United States Patent
Burke et al.

(10) Patent No.: US 10,095,986 B2
(45) Date of Patent: Oct. 9, 2018

(54) SYSTEM AND METHOD OF ELECTRONICALLY CLASSIFYING TRANSPORTATION DOCUMENTS

(71) Applicant: Pegasus TransTech LLC, Tampa, FL (US)

(72) Inventors: Don Burke, Tampa, FL (US); Peter Rhode, Tampa, FL (US); Mike Stuhley, Lake Forest, CA (US)

(73) Assignee: PEGASUS TRANSTECH LLC, Tampa, FL (US)

( * ) Notice: Subject to any disclaimer, the term of this patent is extended or adjusted under 35 U.S.C. 154(b) by 454 days.

(21) Appl. No.: 14/712,874

(22) Filed: May 14, 2015

(65) Prior Publication Data

US 2015/0331931 A1    Nov. 19, 2015

Related U.S. Application Data

(60) Provisional application No. 61/996,694, filed on May 14, 2014.

(51) Int. Cl.

| *G06F 7/02* | (2006.01) |
| *G06F 17/30* | (2006.01) |
| *G06Q 10/00* | (2012.01) |
| *G06Q 50/30* | (2012.01) |
| *G06Q 10/08* | (2012.01) |

(52) U.S. Cl.
CPC ....... *G06Q 10/00* (2013.01); *G06F 17/30011* (2013.01); *G06F 17/30598* (2013.01); *G06Q 10/08* (2013.01); *G06Q 50/30* (2013.01)

(58) Field of Classification Search
CPC .. G06Q 10/08; G06Q 10/083; G06Q 10/0833; G06Q 50/28; G06Q 10/0835; G06Q 50/30; G06F 17/30598; G06F 17/30011
See application file for complete search history.

(56) References Cited

U.S. PATENT DOCUMENTS

| 5,168,444 A | 12/1992 | Cukor et al. |
| 5,991,709 A | 11/1999 | Schoen |
| 7,883,013 B2 | 2/2011 | Skaaksrud et al. |
| 8,140,468 B2 | 3/2012 | Kwok et al. |
| 8,176,004 B2 | 5/2012 | Malaney et al. |

(Continued)

*Primary Examiner* — Bruce M Moser
(74) *Attorney, Agent, or Firm* — K&L Gates LLP

(57) ABSTRACT

Computer-implemented methods and systems for classifying documents and freight-truck-transaction documents are described. A method may comprise receiving document data corresponding to a document, at a document classification device, wherein the document data comprises text data. The method may further comprise detecting, at the document classification device, an existence of, or an absence of, one or more predetermined text fields in the document based upon, at least in part, the document data. The method may additionally comprise assigning, at the document classification device, a value to the one or more predetermined text fields based upon, at least in part, the existence of, or the absence of, the one or more predetermined text fields in the document. The method may also comprise determining, at the document classification device, a score for the document based upon, at least in part, values assigned to the one or more predetermined text fields.

3 Claims, 29 Drawing Sheets

(56) References Cited

U.S. PATENT DOCUMENTS

| | | |
|---|---|---|
| 8,321,307 B2 | 11/2012 | Roberts et al. |
| 8,622,294 B1 | 1/2014 | Meyers |
| 2006/0100893 A1 | 5/2006 | Cunningham et al. |
| 2009/0125549 A1* | 5/2009 | Li ........................... G06Q 30/02 |
| 2011/0035345 A1* | 2/2011 | Duan ................ G06F 17/30873 |
| | | 706/12 |
| 2014/0207658 A1* | 7/2014 | Kerr ....................... G06Q 30/01 |
| | | 705/39 |
| 2017/0091321 A1* | 3/2017 | Morimoto ......... G06F 17/30707 |

* cited by examiner

Trip Sheet trip.ini [bill of lading / proof of delivery]

[POSITIVE PHRASES]
TRIP SHEET=1
SCAN ALL DOCUMENTS=1
SCAN THIS ENVELOPE FIRST=1
TRANSFLO EXPRESS LOCATION=1
TRANSFLO EXPRESS=1
COVER SHEET=1
TRIP REPORT COVER PAGE=1
SCAN DOCUMENTS=1

[PHRASE COMBINATIONS]

[NEGATIVE PHRASES]
BILL OF LADING=-1

[ERRORS]
Errors allowed per phrase=1

[LOCATION]

[DOCTYPE CODE]
BOL

[DOCTYPE SCORE]
10

FIG. 4

Bill of Lading bol.ini [bill of lading / proof of delivery]

[POSITIVE PHRASES]
THIS SHIPPING ORDER=1
VICS BOL #=1
MANIFEST SUMMARY AND BILL OF LAD=1
CHEMTRAC=1
(800) 424 9300=1
PROOF OF DELIVERY=1
DELIVERY RECEIPT MUST BE SIGNED AND RETURNED=1
STRAIGHT BILL OF LADING=1
THIS MEMORANDUM=1
STRAIGHT BILL OF LADING – SHORT FORM – ORIGINAL – Not Negotiable=1
This Shipping Order=1
Load Manifest=1
LOAD MANIFEST=1
CONSIGNEES' MANIFEST=1
WAL-MART PRIVATE FLEET MANUAL TRIP SHEET=1
BILL OF LADING=1
Bill of Lading Number=1
Bill of Lading / Shipment=1
NON NEGOTIABLE BILL OF LADING=1
SUPPLEMENT TO THE BILL OF LADING=1
MASTER BILL OF LADING=1
STRAIGHT BILL OF LADING=1
SHIPPING DOCUMENT=1
PURCHASED DISPATCH NOTICE=1
BOL SHEET=1
FREIGHT MANIFEST=1
BOL=1
ADVANCE SHIPPING NOTICE=1
CUSTOMER BILLING TICKET=1
Customer Billing Ticket=1

[PHRASE COMBINATIONS]
STACKING +REPORT=1

[NEGATIVE PHRASES]
TARE WEIGHT=-1

[ERRORS]
Errors allowed per phrase=1

[LOCATION]

[DOCTYPE CODE]
BOL

[DOCTYPE SCORE]
10

FIG. 5

Invoice:

invoice.ini [invoice]

[POSITIVE PHRASES]
INVOICE=1
Invoice=1
TO BE PAID IN THE AMOUNT OF=1
To be paid in the amount of=1
LOAD INVOICE=1
Date Invoiced=1
INVOICE/QUICKPAY=1

[PHRASE COMBINATIONS]

[NEGATIVE PHRASES]

[ERRORS]
Errors allowed per phrase=1

[LOCATION]

[DOCTYPE CODE]
INV

[DOCTYPE SCORE]
3

FIG. 6

Rate Confirmation Sheet:

rate.ini [rate confirmation sheet]

[POSITIVE PHRASES]
Load Confirmation=1
Carrier Confirmation=1

[PHRASE COMBINATIONS]

[NEGATIVE PHRASES]

[ERRORS]
Errors allowed per phrase=1

[LOCATION]

[DOCTYPE CODE]
RCF

[DOCTYPE SCORE]
3

FIG. 7

Seal Manifest:

seal.ini [seal manifest]

[POSITIVE PHRASES]
Seal Manifest=1
Shippers Original Seal #=1
Seal #=1
seal manifest=1

[PHRASE COMBINATIONS]

[NEGATIVE PHRASES]
break seal=-1

[ERRORS]
Errors allowed per phrase=1

[LOCATION]

[DOCTYPE CODE]
SMF

[DOCTYPE SCORE]
3

FIG. 8

Toll Receipt:

toll.ini [toll receipt]

[POSITIVE PHRASES]
TOLL RECEIPT=1
TURNPIKE=1
TURNPIKE AUTHORITY=1
ENTRY PLAZA=1
EXIT PLAZA=1
K-TAG=1
MYKTAG.COM=1
TRANSPORTATION CORRIDOR AGENCIES=1
PIKEPASS=1
www.pikepass.com=1
E-Zpass=1
www.ezpassde=1
Class 5=1
FLORIDA TURNPIKE ENTERPRISES=1
ILLINOIS STATE TOLL=1
HIGHWAY=AUTHORITY=1
INDIANA TOLL ROAD=1
STATE TOLL=1

[PHRASE COMBINATIONS]

[NEGATIVE PHRASES]

[ERRORS]
Errors allowed per phrase=1

[LOCATION]

[DOCTYPE CODE]
TOL

[DOCTYPE SCORE]
3

FIG. 9

Fuel Receipt:

fuel.ini [fuel receipt]

[POSITIVE PHRASES]
DIESEL=1
GALLONS=1
gallons=1
Price/Gal :=1
Price / Gal :=1
Truck Diesel=1
Trdsl=1
DEF=1
DEF Fuel Item=1
COMDATA=1
Comdata=1
COMDA=1
EFS FUEL=1
EFS / TRANSACTION CARD=1
EFS Card=1
FLEETONE=1
GROSS DSL=1
GROSS RFR=1
Reefer Fuel=1
TCH=1
TCH Card=1
PETRO-PASS=1
QTY LITRES=1

[PHRASE COMBINATIONS]
PILOT FLYING J TRANSPORTATION=-1

[NEGATIVE PHRASES]
UNLEADED=-1
MID-GRADE=-1
LOADING INFORMATION=-1
UNLOADING INFORMATION=-1
ORIGINAL INVOICE=-1
Original Invoice=-1

[ERRORS]
Errors allowed per phrase=1

[LOCATION]

[DOCTYPE CODE]
FUL

[DOCTYPE SCORE]
3

FIG. 10

Fuel and Mileage fuelandmileage.ini [fuel and mileage – trip sheet]

[POSITIVE PHRASES]
BEGINNING MILEAGE=1
ENDING MILEAGE=1
START ODOMETER=1
STOP ODOMETER=1
ODOMETER READING ENTERING STATE=1
TOTAL STATE MILEAGE=1
STATE MILES=1
Interstate Fuel and Mileage Reporting System=1
BEGINNING ODOMETER =1
ENDING ODOMETER =1

[PHRASE COMBINATIONS]
BEGINNING MILEAGE=1
ENDING MILEAGE=1

ODOMETER READING ENTERING STATE=1
TOTAL STATE MILEAGE=1
STATE MILES=1

[NEGATIVE PHRASES]

[ERRORS]
Errors allowed per phrase=1

[LOCATION]

[DOCTYPE CODE]
FMS

[DOCTYPE SCORE]
3

FIG. 11

Scale Receipt:

scale.ini [Scale Receipt]

[POSITIVE PHRASES]
STEER WEIGHT=1
Steer Weight=1
TANDEM WEIGHT=1
Tandem Weight=1
TRAILER WEIGHT=1
Trailer Weight=1
WEIGHMASTER=1
Weighmaster=1
Weigh Ticket=1
CAT SCALE COMPANY=3
PUBLIC WEIGHMASTERS=2
www.catscale.com=1
WEIGHT & MEASURE=1
SCALE TICKET=1
WEIGHMASTER SIGNATURE=1
WEIGHER=1
LBS. TARE=1
ELECTRONIC SCALE TICKET=1
TARE WEIGHT=1
STEER AXLE=1
DRIVE AXLE=1
TRAILER=1

[PHRASE COMBINATIONS]
TARE WEIGHT=1
GROSS WEIGHT=1
NET WEIGHT=1

GROSS WT=1
TARE WT=1
NET WT=1

[NEGATIVE PHRASES]

[ERRORS]
Errors allowed per phrase=1

[LOCATION]

[DOCTYPE CODE]
WGT

[DOCTYPE SCORE]
3

FIG. 12

Lumper:

lumper.ini [lumper receipt]

[POSITIVE PHRASES]
UNLOADING ALLOWANCE TICKET=1
WMW-133=1
UNLOAD RECEIPT=1
Unload Receipt=1
Unloader Name=1
Unload Fee=1
Unloading Agreement=1
Universal Lumper=1
Lumping Receipt=1
LUMPING RECEIPT=1

[PHRASE COMBINATIONS]

[NEGATIVE PHRASES]

[ERRORS]
Errors allowed per phrase=1

[LOCATION]

[DOCTYPE CODE]
LUM

[DOCTYPE SCORE]
2

FIG. 13

Custom Forms:

custom.ini [Custom Forms]

[POSITIVE PHRASES]
PARS NOTIFICATION for Canada Bound Shipments=1
ETA at Border=1
Canadian Food=1
Canadian Food Inspection Agency=1
Confirmation of Sale / Confirmation De Vente=1
ACE eManifest for Canada=1
Port of Entry=1
BorderConnect=1
Ace electronic manifest – to USA=1
Border ETA=1
Port of Arrival=1
ACI E-MANIFEST LEAD SHEET=1

[PHRASE COMBINATIONS]
Canadian Food
Inspection Agency=1
PRO FORMA INVOICE
FOR CUSTOM PURPOSES ONLY=1

[NEGATIVE PHRASES]

[ERRORS]
Errors allowed per phrase=1

[LOCATION]

[DOCTYPE CODE]
CUS

[DOCTYPE SCORE]
3

FIG. 14

Vehicle Inspection Report:

dvr.ini [vehicle inspection report]

[POSITIVE PHRASES]
DRIVER'S VEHICLE INSPECTION REPORT=1
CONDITION OF THE ABOVE VEHICLE IS SATISFACTORY=1
DEFECTS CORRECTED=1
CHECK ANY DEFECTIVE ITEM=1
Trailer Inspection Form=1
DRIVER/VEHICLE EXAMINATION REPORT=1
Inspection Date=1
VIOLATIONS=1
Badge#=1
Truck Inspection Requirements=1
DRIVER TRAILER VEHICLE INSPECTION REPORT=1
DRIVER CHECKLIST=1
DRIVER VEHICLE INSPECTION REPORT – POWER=1
DRIVER VEHICLE INSPECTION REPORT – TRAILER=1

[PHRASE COMBINATIONS]

[NEGATIVE PHRASES]

[ERRORS]
Errors allowed per phrase=1

[LOCATION]

[DOCTYPE CODE]
DVR

[DOCTYPE SCORE]
3

FIG. 15

Vehicle Mileage Report:

vmr.ini [vehicle mileage report]

[POSITIVE PHRASES]
BEGINNING ODOMETER=1
ENDING ODOMETER=1
FUEL AND MILEAGE=1

[PHRASE COMBINATIONS]

[NEGATIVE PHRASES]

[ERRORS]
Errors allowed per phrase=1

[LOCATION]

[DOCTYPE CODE]
VMR

[DOCTYPE SCORE]
3

FIG. 16

Receipt:

vmr.ini [vehicle mileage report]

[POSITIVE PHRASES]
TruckWash Location=1
Truck Wash=1
TRUCK WASH=1
WASHOUT=1
Standard Washout=1
Pilot Car Service=1
PILOT CAR SERVICE=1
PILOT CAR SERVICE=1
Escort=1

[PHRASE COMBINATIONS]

[NEGATIVE PHRASES]

[ERRORS]
Errors allowed per phrase=1

[LOCATION]

[DOCTYPE CODE]
RCT

[DOCTYPE SCORE]
3

FIG. 17

Trailer Control Record:

tcr.ini [trailer control record]

[POSITIVE PHRASES]
Trailer Control Record=1
TRAILER CONTROL RECORD=1

[PHRASE COMBINATIONS]

[NEGATIVE PHRASES]

[ERRORS]
Errors allowed per phrase=1

[LOCATION]

[DOCTYPE CODE]
TCR

[DOCTYPE SCORE]
3

FIG. 18

Trailer Interchange Form:

tir.ini [trailer interchange form]

[POSITIVE PHRASES]
TRAILER INTERCHANGE RECEIPT INSPECTION REPORT=1
Terminal Interchange/Inspection Receipt=1

[PHRASE COMBINATIONS]

[NEGATIVE PHRASES]

[ERRORS]
Errors allowed per phrase=1

[LOCATION]

[DOCTYPE CODE]
TCR

[DOCTYPE SCORE]
3

FIG. 19

Packing Slip:

pac.ini [packing slip delivery receipt]

[POSITIVE PHRASES]
MANIFEST/PACKING LIST=1
Goods receipt – count list=1
Packing List=1
End of Packing List=1
FLEET LTL NETWORK MANIFEST=1
DELIVERY RECEIPT=1
PICK LIST=1

[PHRASE COMBINATIONS]

[NEGATIVE PHRASES]

[ERRORS]
Errors allowed per phrase=1

[LOCATION]

[DOCTYPE CODE]
PAC

[DOCTYPE SCORE]
3

FIG. 20

Road Repair repair.ini (repair order)

[POSITIVE PHRASES]
ROAD SERVICE=1
ROADCALL=1
VALVE STEM=1
MUDFLAP=1
ESTIMATE/WORK ORDER=1

[PHRASE COMBINATIONS]

[NEGATIVE PHRASES]

[ERRORS]
Errors allowed per phrase=1

[LOCATION]

[DOCTYPE CODE]
RDR

[DOCTYPE SCORE]
3

FIG. 21

DETENTION:

detention.ini [detention]

[POSITIVE PHRASES]
DEMURRAGE TICKET=1
TOTAL DEMURRAGE HOURS=1
DETENTION=1
DEMURRAGE=3

[PHRASE COMBINATIONS]

[NEGATIVE PHRASES]

[ERRORS]
Errors allowed per phrase=1

[LOCATION]

[DOCTYPE CODE]
DET

[DOCTYPE SCORE]
3

FIG. 22

Citation:

detention.ini [detention]

[POSITIVE PHRASES]
Violator's Copy=1
TYPE OF VIOLATION=1
LOCATION OF VIOLATION=1
SIGNATURE OF OFFICER=1

[PHRASE COMBINATIONS]

[NEGATIVE PHRASES]

[ERRORS]
Errors allowed per phrase=1

[LOCATION]

[DOCTYPE CODE]
DET

[DOCTYPE SCORE]
3

FIG. 23

SYSTEM AND METHOD OF ELECTRONICALLY CLASSIFYING TRANSPORTATION DOCUMENTS

RELATED APPLICATIONS

This application claims priority to U.S. Provisional Patent Application No. 61/996,694 filed on May 14, 2014, the disclosure of which is herein incorporated by reference in its entirety.

TECHNICAL FIELD

The technical field may generally relate to electronically classifying documents.

BACKGROUND

Each day, U.S. truckers travel more than 250 million miles, carrying needed goods to, from and within all fifty states. Two-thirds of the nation's goods by weight is moved by truck, enabling oranges to be enjoyed by northern consumers in the coldest months of winter, health supplies and other necessities to be delivered to nearly any location from the most populous to the most remote, and supplying homes, stores, and industry anywhere that is adjacent to drivable road with nearly any goods imaginable.

A single delivery of freight by one truck can generate substantial important data that must be collected, monitored and processed for logistical, financial, and legal reasons. Typical information generated and tracked in such transactions can include the names and addresses of the shipper (consignor), recipient (consignee), and carrier (trucking company/individual), an itemized list of the quantity, type, weight and value of goods shipped, description of the condition of goods, legal rights and obligations related to the shipment, and dates and times of departure and arrival at the various destination(s) along a route. The information above, extracted from a bill of lading—a common document issued by a carrier of goods to the shipper of goods—when multiplied by hundreds of thousands per day, creates enormous information management issues. In addition, there are many more trucking documents to capture and store, such as proofs of delivery, packing lists, receipts, fuel and mileage, accident reports, customs forms, inspections, tolls, and more.

BRIEF SUMMARY

In an embodiment, a computer-implemented method for classifying freight-truck-transaction documents at a freight-truck-transaction document classification device may include receiving freight-truck-transaction document data corresponding to documents related to the transport of freight by truck, at the freight-truck-transaction document classification device, wherein the document data comprises freight-truck-transaction document text data. The method may also include detecting, at the freight-truck-transaction document classification device, an existence of, or an absence of, one or more predetermined freight-truck-transaction document text fields in the documents based upon, at least in part, the document data, wherein the predetermined freight-truck-transaction document text fields include one or more of: bill of lading, invoice, ticket number, log, sale, gallons, unloading, receipt, turnpike, toll, and confirmation. The method may further include assigning, at the freight-truck-transaction document classification device, a value to the one or more predetermined freight-truck-transaction document text fields based upon, at least in part, the existence of, or the absence of, the one or more predetermined freight-truck-transaction document text fields in the documents. The method may additionally include determining, at the freight-truck-transaction document classification device, a score for each of the documents based upon, at least in part, values assigned to the one or more predetermined freight-truck-transaction document text fields. Moreover, the method may include determining, at the freight-truck-transaction document classification device, whether each document is classifiable based upon, at least in part, the score for each document. Further more, the method may include in response to determining whether one or more of the documents are classifiable, classifying the one or more documents as a document type based upon, at least in part, the score, and predefined document classification rules, wherein the document type is at least one of a bill of lading, a proofs of delivery, a packing list, a receipt, a fuel and mileage document, an accident report, a customs form, an inspections forms, and a toll document.

In an embodiment, a computer-implemented method for classifying documents may include receiving document data corresponding to a document, at a document classification device, wherein the document data comprises text data. The method may further include detecting, at the document classification device, an existence of, or an absence of, one or more predetermined text fields in the document based upon, at least in part, the document data. The method may also include assigning, at the document classification device, a value to the one or more predetermined text fields based upon, at least in part, the existence of, or the absence of, the one or more predetermined text fields in the document. The method may additionally include determining, at the document classification device, a score for the document based upon, at least in part, values assigned to the one or more predetermined text fields. Moreover, the method may include determining, at the document classification device, whether the document is classifiable based upon, at least in part, the score for the document.

One or more of the following features may be included. The method may include, in response to determining that the document is classifiable, classifying the document as a document type based upon, at least in part, the score, and predefined document classification rules. The document classification device may be in communication with a scanner at a truck stop. An optical character recognition mechanism may be used, at least in part, to extract the document data from the document. The document classification rules may be stored in a .ini file. The score may be further based on a weighted scoring system, and the weighted scoring system may be based upon, at least in part, at least one of: one or more keywords, keyword placements, positive phrases, and negative phrases of the document. The method may further include applying a weighted classification mechanism by: testing the document data for predetermined criteria wherein each criterion is assigned a weight; scoring the document based upon a criterion being met; and classifying the document based on the score.

In an implementation, the method may include comparing the score to scores of other documents. The method may further include processing the scores to produce metascores corresponding to an analysis of document data of multiple documents. Assigning the value for the one or more predetermined text fields may further include assigning the value for at least one of: a positive phrase wherein the predetermined text field is present; a negative phrase wherein the predetermined text field is absent; and a combination of phrases wherein a combination of predetermined text fields are present. The document type may be at least one of: a bill of lading, a proofs of delivery, a packing list, a receipt, a fuel and mileage document, an accident report, a customs form, an inspections forms, and a toll document. Determining whether the document is classifiable may be further based upon a threshold score corresponding to a level of confidence that the document is classifiable. A value may be added based on a predetermined text field being detected in the document data and a value may be subtracted based on a predetermined text field being undetected in the document data.

In an implementation, the method may include determining that the document is unclassifiable based upon the score for the document. The method may further include, in response to determining that the document is unclassifiable, transmitting the document back to a sender. The values assigned to the one or more predetermined text fields and the threshold score may be customer specific and the values assigned to the one or more predetermined text fields and the threshold score for one customer may be different than for another customer. The method may further include assigning a value to the one or more predetermined text fields based upon, at least in part, a location of the one or more predetermined text fields in the document. The method may also include creating metarules based upon scoring and classifying multiple documents, wherein the metarules increase a degree of confidence under which documents are classified and improve classification accuracy.

In an embodiment, a document classification system may include a document imaging module configured to convert images to a group of electronic documents, and wherein the document classification system is configured to assign a traceable classification number to the group of electronic documents. The system may further include a scoring engine module configured to assign a score to each of the electronic documents in the group of electronic documents based upon detecting one or more text phrases in each of the electronic documents, and wherein the document classification system is configured to map values for one or more detected text phrases to a customer specific scoring. The system may also include a rules engine module for classifying one or more electronic documents in the group of electronic documents based upon an assigned score for the one or more electronic documents and the customer specific scoring, and wherein the document classification system is configured to transmit the group of electronic documents to a customer with one or more document classifications for one or more of the electronic documents.

The details of one or more implementations are set forth in the accompanying drawings and the description below. Other features and advantages will become apparent from the description, the drawings, and the claims.

BRIEF DESCRIPTION OF THE DRAWINGS

FIGS. 4-23 illustrate example files comprising rules in accordance with various embodiments.

DETAILED DESCRIPTION

Overview

Figure 1:
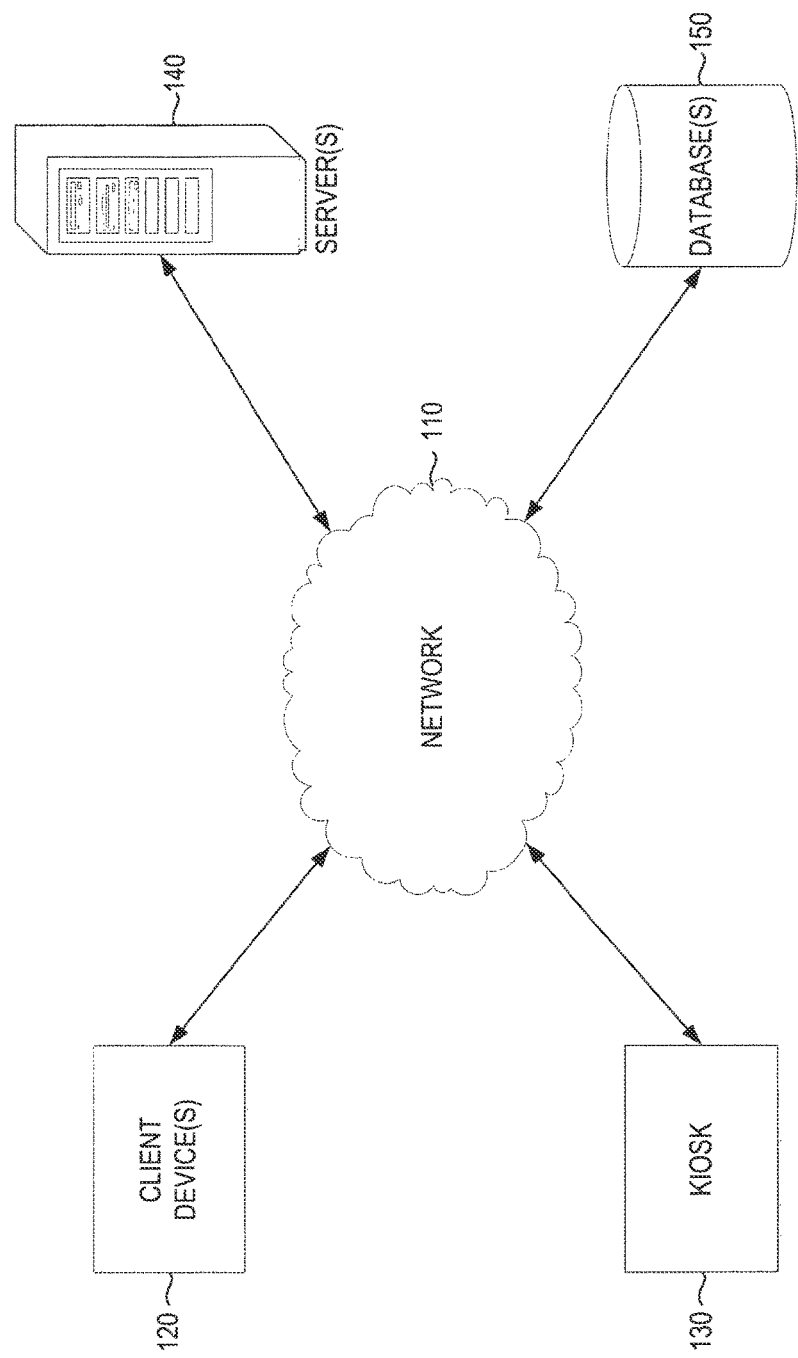
FIG. 1 illustrates an example computing environment in accordance with various embodiments.

Even as the trucking industry hauls 10 billion tons of freight per year in the U.S., the sheer weight of goods delivered is not the only matter of great enormity. In fact, the trucking industry is very information-intensive. The complexity of information generated, stored, and processed is vast. Information generated by, and necessary for management of, trucking can be derived from documents or other communications that can comprise or relate to bills of lading, proofs of delivery, packing lists, receipts, fuel and mileage, accident reports, customs forms, inspections, and tolls. These documents may be referred to as freight-truck-transaction documents. In addition, there are numerous additional data points that can be captured and stored. Put another way, with the millions of trips made each year by truck, there can be many millions if not billions of associated documents or other communications. Streamlining document management and processing can result in more overall efficiency, enable quicker delivery of goods, faster invoicing and payment, improved driver responsiveness and productivity, and reduce fuel consumption.

Classifying transportation documents can be accomplished by a weighted scoring system. Text and other information can be extracted from documents being processed in a document delivery mechanism. Business rules and key word patterns can be used to fingerprint and classify each document. Each document can be unique like a fingerprint but a number of factors can be predetermined, weighted and used to derive a "score" for each result. Such factors can include keywords, keyword placement, positive phrases, and negative phrases. The result can be used by itself or compared to other scores. Data mining and rules refinement can take place based on a plurality of documents, and/or based on a plurality of iterations of document classification runs, resulting in further enhancements. Files can be produced, such as but not limited to .ini files, that comprise classification rules.

In an embodiment, a shipper (consignor) wishes to transport goods to a recipient (consignee). The shipper can engage a broker or other agent to locate a carrier, or engage the carrier directly. In connection with the delivery of goods to the carrier, the carrier can issue a bill of lading. A bill of lading serves several purposes. It can serve as a receipt for basic details of the goods shipped, i.e., quantity, weight, markings or item numbers, condition, and more. It can also serve a legal purpose by evidencing the contract between carrier and shipper. Further, it can designate who has title to the goods. However, bills of lading can take many forms and can be quite varied in substance, format and style. In short, bills of lading or other documents can be, to say the least, non-uniform.

There can be multiple points along a route where a driver engages in an information-generating transaction. For example, documents can be generated when the carrier takes possession of the goods, at points throughout a journey, and at the destination. It may be desirable at some or all of these points for a driver to communicate the document and associated information to the carrier for information processing. Although it is possible to send a bill of lading or other document by mail or courier, they are often sent in electronic form, such as by email, facsimile or other format from a driver to the carrier. For example, a driver can use a scanning device at a truckstop, including a kiosk or other scanning device resident at a truckstop. In addition, a driver can use a mobile device such as a smart phone or other client device and take a photograph of a document(s). Also, a driver can import a pre-scan from the client device's image library. The driver can then transmit the image(s) over network to a carrier server and/or database. For a carrier of even a modest size, this can result in being inundated with many thousands or even millions of electronic documents in a short period of time.

System Overview

Embodiments can operate on one or more servers, one or more clients, one or more communications networks, and appropriate memory/memories, interfaces, and other modalities by which such actions are carried out.

FIG. 1 shows a diagram of a computer system by which various embodiments can operate. There is provided a server 140 or a plurality of servers 140. One or more servers, and multiple architectures, components and interconnections can be used to carry out embodiments.

Server 140 can be electronically interconnected with a network or networks 110. Network 110 can be connected with a client device 120. Client device 120 may comprise one device or multiple devices. Such device(s) 120 can include a mobile device such as a phone or smart phone, a tablet device, desktop computer, laptop computer comprising components such as tower, keyboard, mouse, and monitor. Such devices 120 can also include smart watches and smart glasses. Network 110 can be connected with one or more databases 150. A kiosk 130 or other freestanding device which may have scanning capability can be employed in communication with network 110, which itself is in communication with server 140 and database 150. A user can interact with kiosk 130 or other freestanding device and be in communication with added software and hardware disclosed herein.

Multiple configurations are possible depending on the architecture and functionality desired. There may be multiple processors in one or more devices in elements depicted in FIG. 1, and multiple databases and memories. Network 110 can comprise one or more networks of any type such as a hyperlocal, local, or regional network, the Internet, a private network, wireless, wired, or one or more networks forming a combination of all of the above. Communication can flow in any direction, e.g., from or to client 120, server 140 or any other component(s). Thus, FIG. 1 illustrates only of many computer systems, components and interconnections possible to accomplish embodiments described herein.

Figure 2:
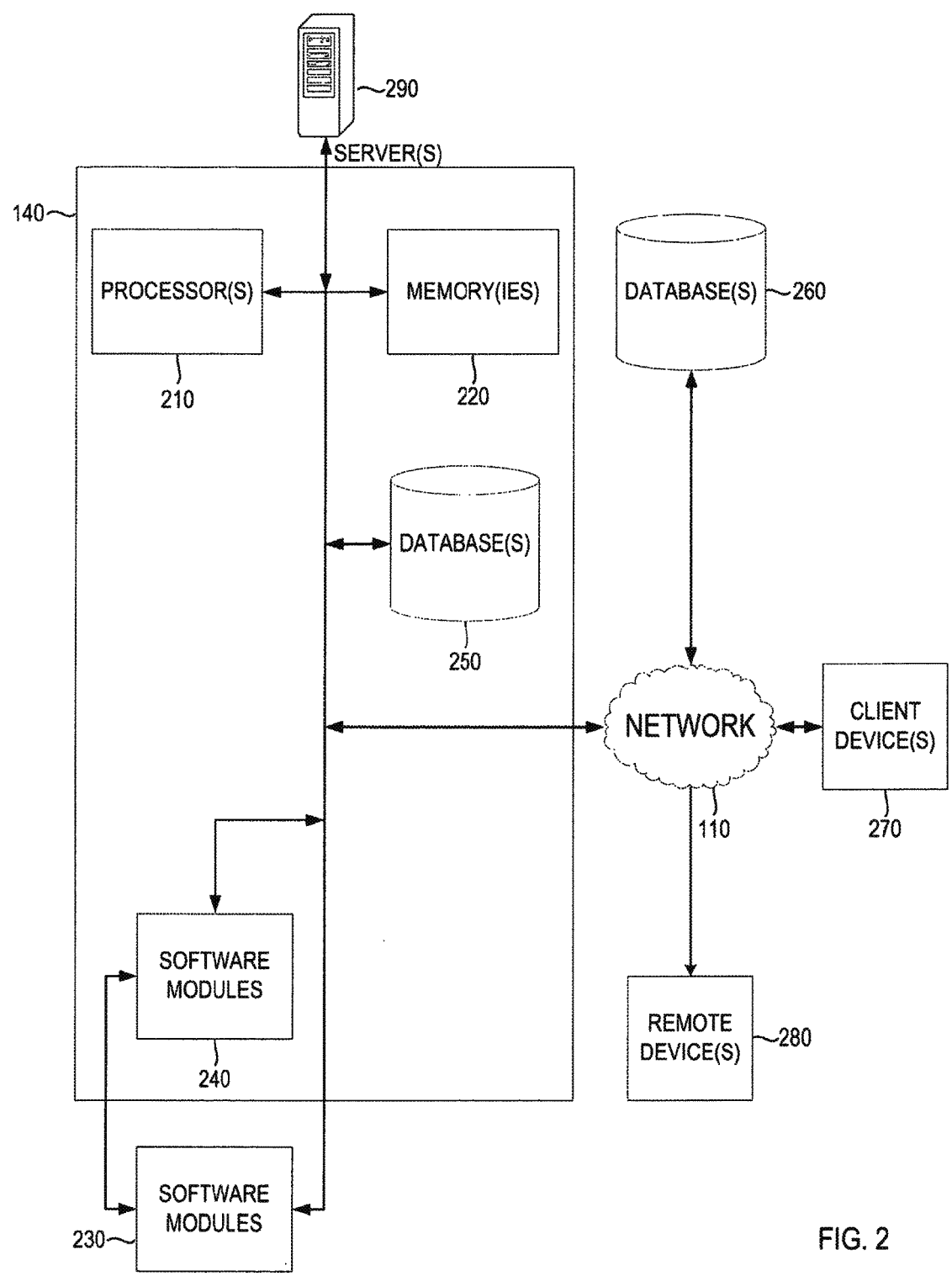
FIG. 2 illustrates an example server and components in communication therewith in accordance with various embodiments.

FIG. 2 is a non-limiting example of a server 140. Server 140 can contain a processor 210, or a plurality of processors. Server 140 can contain a memory 220, or memories, which can contain RAM and ROM. Server 140 can contain a database 250 or databases. Server 140 can contain, or be in communication with, software modules 240 located within the server or software modules 230 located at a different location. It will be appreciated that software used to accomplish embodiments can be physically or architecturally proximate to server 140. Architectural proximity enables software 230 to be physically located at a distant location so long as server 140 can access and process such software 230. Server 140 can be in operative communication with a remote server 290 or servers.

Server 140 can communicate with external database 260 or databases through a network 110. Server 140 can communicate with a client device 270 or client devices through a network 110. Server 140 can communicate with an added remote device 280 or remote devices through a network 110.

Multiple configurations of server 140, database 260 or databases, mobile device 270 or mobile devices, and remote device 280 or remote devices are possible.

Example embodiments can employ one or more servers, one or more clients, one or more communications networks, and appropriate memory/memories, interfaces, and other modalities by which such actions are carried out.

A client device 120 can have a display. This can include an interactive display wherein the user can interact by means of touching the display. This so-called "touchscreen" capability may be employed. As well, a user can interact with a display by a keyboard or other input device.

Databases 150, 250 and/or 260 can comprise a relational database. Such databases may be based on another database model, such as object-oriented or hierarchical.

Figure 3:
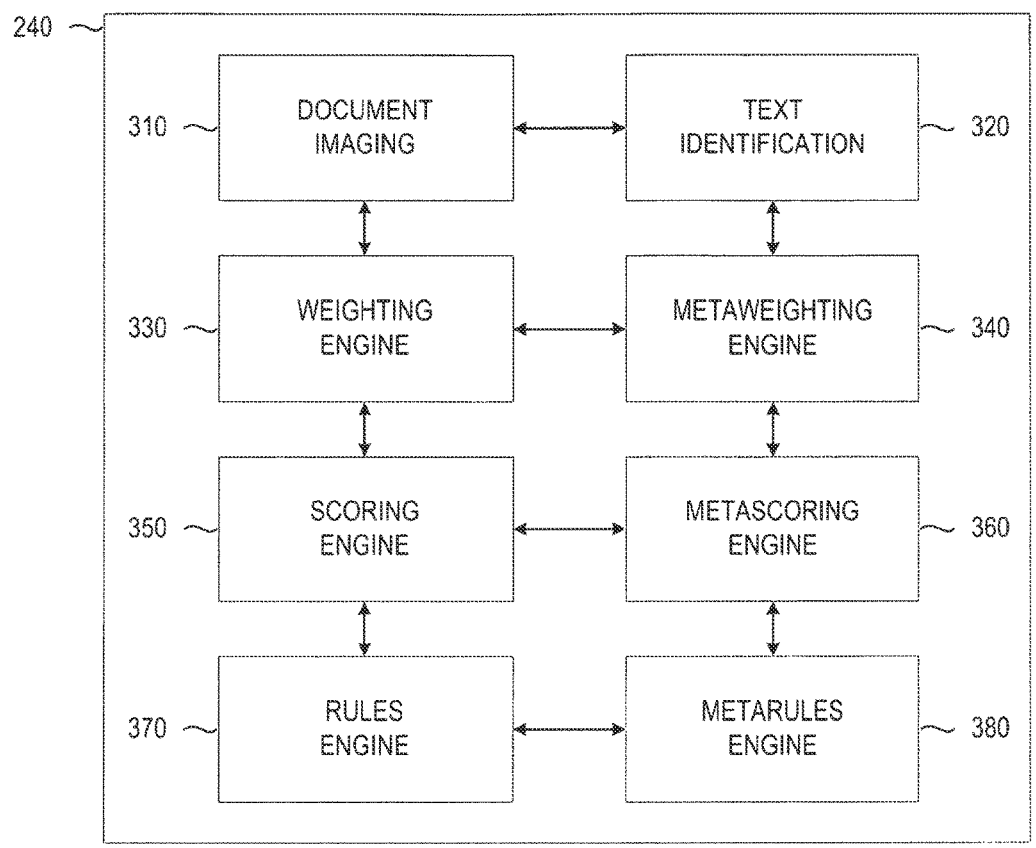
FIG. 3 illustrates example software modules in accordance with various embodiments.

FIG. 3 illustrates example software modules that can be used. These software modules can comprise or consist of software modules 240, which can intercommunicate with each other. For non-limiting illustrative purposes, the software modules herein can comprise software modules 230 as well, and comprise a combination of software modules 230 and 240. One or more of these software modules working in connection with each other may form an application, such as a document classification application, or a freight-truck-transaction document classification application, which may carry out one or more of the techniques and features described here. As shown, the software modules may include a document imaging module 310, a text identification module 320, a weighting engine module 330, a meta-weighting engine module 340, a scoring engine module 350, a metascoring engine module 360, a rules engine module 370, and a metarules engine module 380.

An OCR (optical character recognition) document extraction mechanism can be used. This can convert an imaged document, sent by a driver or other individual, into text (and possibly graphics). However, merely rendering as text a formerly imaged document has limitations. It does not in itself provide manageable, processable information that can support billing and settlement, legal arrangements, and other matters. Put another way, the carrier's computer system may not be able to discern the difference between a bill of lading, a traffic ticket, or a check made out in payment.

Document Classification

Figure 27:
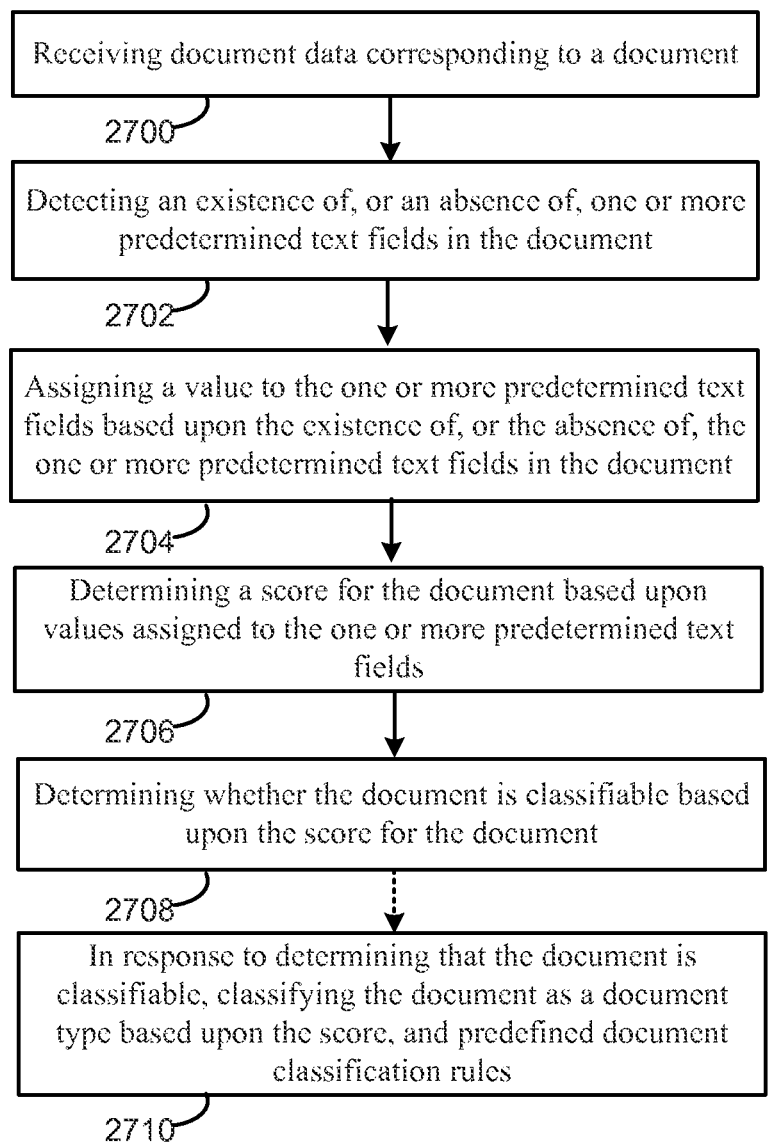
FIG. 27 is a flowchart illustrating operations which may be performed in accordance with various embodiments of the present disclosure.
Figure 28:
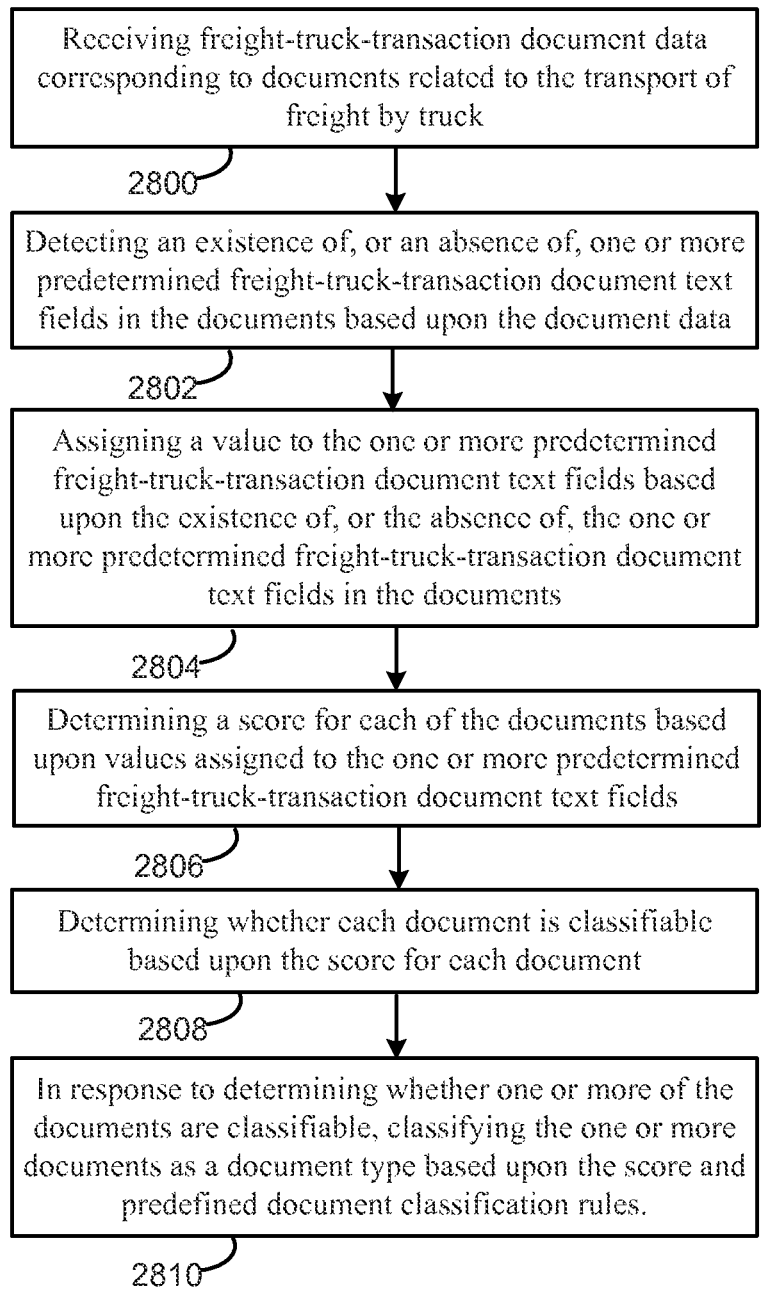
FIG. 28 is also a flowchart illustrating operations which may be performed in accordance with various embodiments of the present disclosure.

Referring now also to FIGS. 27 and 28, document data corresponding to a document may be received (2700) (2800) at a document classification device. The document may be a freight-truck-transaction document as described herein (e.g., bill of lading, invoice, etc.) The document data may include text data or freight-truck-transaction document text data as referenced in FIGS. 4-23. The document may have been scanned at a scanner or photographed on, e.g., a smartphone to create an image of the document. The image may have been created by document imaging module 310, which may also convert the document images into a group of electronic documents. The document data may have been extracted from the image by, e.g., text identification module 320 as shown in FIG. 3. The document classification device may be any one or a combination of any of the servers, clients, and client devices described above, which may also form a document classification system (also referred to as system). For example, the document classification device may be a smartphone running a computer-implemented, of a server or client device in communication with a scanner. The scanner may be, for example, at a kiosk with the client device at a truck stop. In an embodiment, the document classification device may be a freight-truck-transaction document classification device when configured to run an application executing the techniques and features described here.

Documents can be classified by using a weighted classification mechanism. This mechanism can take a document and test for a number of predetermined criteria. Each criterion can assigned a weight. After weighting operations are performed, a score can be obtained for each document to the extent that a given criterion is met. The score can be used by itself, compared to other scores, processed so as to produce metascores reflecting an analysis of multiple documents and their scores, and other operations can be performed. As well, intelligent operations can be performed wherein the weighting can be enhanced and refined, and/or metaweighting functions introduced after evaluation of multiple iterations of classification. Multiple uses of weighing and scoring documents, and data mining operations, are contemplated by various embodiments.

In an embodiment, a classification mechanism can assist in determining the type of document from the raw data. This may include document classification rules. Types of documents that can be discerned include bills of lading, proofs of delivery, packing lists, receipts, fuel and mileage documents, accident reports, customs forms, inspections forms, tolls, and others. Rules can be stored in or association with an ".ini" file. Other formats can be used.

Rules can test for text fields containing positive phrases, where a text field is present. In this way, the system can assign a value for a positive phrase where the predetermined text field (e.g., invoice) is present. The system may detect predetermined freight-truck-transaction document text fields (e.g., bill of lading, invoice, etc.) in the documents.

Rules can test for negative phrases, where a text field is absent. In this way, the system can test for a negative phrase where the predetermined text field (e.g., invoice) is absent. Further, rules can test for phrase combinations, e.g., combinations of text fields, which can garner a positive score. In this way, the system can assign a value for a combination of phrases where a combination of predetermined text fields (e.g., invoice and total) is present. Rules can test for negative phrases, e.g., combinations of text fields, which can garner a negative score. Thus, a value may be added to the point score for a document if a predetermined text field (e.g., invoice) is detected in the document data. Similarly, a value may be subtracted from the point score for a document if a predetermined text field (e.g., invoice) is undetected in the document data.

Errors may be allowed. Location of the text field on the page of the document, or within a series of pages on a document, can be tested for. For example, the system may assign a value one or more predetermined text fields (e.g., bill of lading, invoice, etc.) based on the location of the one or more predetermined text fields in the document. Point values and thresholds can be set wherein it can be concluded with a given level of confidence that the document can be classified accordingly. Added rules can be imposed.

Text fields (e.g., strings, keywords or other terms) of predetermined identity and/or location in a document can be detected. For example, the system can check for BILL OF LADING or Bill of Lading on a document.

Referring now also to FIGS. 27 and 28, in an embodiment, the system may detect (2702) (2802) an existence of, or an absence of, one or more predetermined text fields in the document. The predetermined text fields may be predetermined freight-truck-transaction document text fields. This may be based upon the document data, freight-truck-transaction document and/or the text data extracted from the image of the document, which may be a freight-truck-transaction document.

Figure 24:
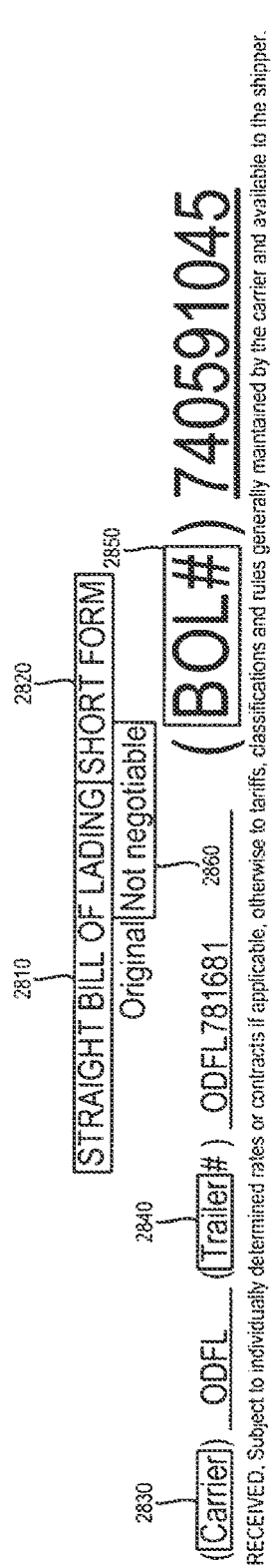
FIG. 24 illustrates example information from a Bill of Lading (BOL).

It can also identify where on a document BILL OF LADING or Bill of Lading is detected. Having detected BILL OF LADING or Bill of Lading, a point value can be assigned. For instance, detecting BILL OF LADING or Bill of Lading can result in assigning 3 points. If SHORT FORM is detected, and is detected at the top of a document, this can be assigned 1 point. Added point values can be added if certain strings are detected. For example, and with reference to FIG. 24, in an embodiment the following can apply:

"BILL OF LADING" 2810 or "Bill of Lading" is in the top. [3 points assigned].

"SHORT FORM" 2820 is in the top. [1 point].

"NOT NEGOTIABLE" 2860 is in the top. [1 point].

"Bill of Lading Number" 2850 is in the top. [1 point].

"CARRIER NAME" 2830 or "Carrier Name" is in the top. [1 point].

"TRAILER" 2840 or "Trailer" is in the top. [1 point].

"SHIPPER SIGNATURE" is in the bottom. [1 point].

"SHIPPER CERTIFICATION" can be assigned significance as well.

"CARRIER SIGNATURE" is in the bottom. [1 point].

"CARRIER CERTIFICATION" can be assigned significance as well.

Referring now also to FIGS. 27 and 28, in this way, the system may assign (2704) (2804) a value to the one or more predetermined text fields (e.g., bill of lading) based upon, at least in part, the existence of, or the absence of, the one or more predetermined text fields in the document. The one or more predetermined text fields may be predetermined freight-truck-transaction document text fields. Further, the system may determine (2706) (2806) a score for the document based upon the values assigned to the one or more predetermined text fields (e.g., 1 point, 3 points, etc.) The document can, accordingly, have a score or point value of 8 points given the above rules set. Further, the system may determine whether the document is classifiable (2708) (2808) based upon the score for the document.

In addition, by way of non-limiting example, a rules set for weighting certain text field(s) in a Bill of Lading can be found at FIG. 5. These rules can be used in conjunction with those above. A Bill of Lading may be a required document to move a freight shipment and a contract between shipper and carrier and may define the details of a shipment. The related rule set may be based on text such as BOL, Bill of Lading, shipper, consignee, origin, destination, date, etc.

In an embodiment, by way of non-limiting example, a rules set for weighting certain text field(s) in a Trip Sheet can be found at FIG. 4. A trip sheet may provide all essential information necessary to process and invoice the freight shipment. The related rule may be based on text such as Load number, tractor number, trailer number, driver name or number, and date.

In an embodiment, by way of non-limiting example, a rules set for weighting certain text field(s) in an Invoice can be found at FIG. 6. An invoice may be the charge a carrier bills the shipper for moving freight. The related rule set may be based on text such as invoice, remittance, bill to, pay, etc.

In an embodiment, by way of non-limiting example, a rules set for weighting certain text field(s) in a Rate Confirmation Sheet can be found at FIG. 7. A rate confirmation may document the agreed upon terms between a carrier and shipper for moving freight. The related rule set may be based on text such as mile amount, fuel surcharge, date, rate, etc.

In an embodiment, by way of non-limiting example, a rules set for weighting certain text field(s) in a Seal manifest can be found at FIG. 8. A seal manifest may document that the load or freight is sealed upon delivery and may include a seal number on the Bill of lading. The related rule set may be based on text such as seal, manifest, seal number, delivery date, destination, etc.

In an embodiment, by way of non-limiting example, a rules set for weighting certain text field(s) in a Toll receipt can be found at FIG. 9. A toll receipt may documents the toll amount paid by the driver/carrier. The related rule set may be based on text such as toll, amount, location, date, etc.

In an embodiment, by way of non-limiting example, a rules set for weighting certain text field(s) in a Fuel receipt can be found at FIG. 10. A fuel receipt may document the fuel amount purchased by the driver/carrier. The related rule set may be based on text such as gallons, amount, Pilot, Loves, TA, date, etc.

In an embodiment, by way of non-limiting example, a rules set for weighting certain text field(s) in a Fuel and Mileage sheet can be found at FIG. 11. A fuel and mileage sheet may be a report of total miles and fuel for a specific freight movement. The related rule set may be based on text such as miles, miles driven, gallons, location, date, etc.

In an embodiment, by way of non-limiting example, a rules set for weighting certain text field(s) in a Scale Receipt can be found at FIG. 12. It may be a receipt documenting a stop at a scale to weigh the truck and trailer. The related rule set may be based on text such as scale, CAT, date, time, amount, etc.

In an embodiment, by way of non-limiting example, a rules set for weighting certain text field(s) in a Lumper can be found at FIG. 13. A lumper receipt may document the amount paid by the driver/carrier for loading or unloading. The related rule set may be based on text such as lumper, loading, unloading, amount, location, date, etc.

In an embodiment, by way of non-limiting example, a rules set for weighting certain text field(s) in a Custom Form can be found at FIG. 14. A custom form may be a general document used for cross border navigation. The related rule set may be based text such as on custom, Canada, Mexico, location, driver name, driver number.

In an embodiment, by way of non-limiting example, a rules set for weighting certain text field(s) in a Vehicle Inspection Report can be found at FIG. 15. A vehicle inspection report may document a power unit or trailer's mechanical condition. The related rule set may be based text such as on vehicle, inspection, DVIR, cab, trailer, etc.

In an embodiment, by way of non-limiting example, a rules set for weighting certain text field(s) in a Vehicle Mileage Report can be found at FIG. 16. A Vehicle Mileage Report may be a report of total fuel for a specific freight movement. The related rule set may be based on text such as miles, miles driven, gallons, location, date, etc.

In an embodiment, by way of non-limiting example, a rules set for weighting certain text field(s) in a Receipt can be found at FIG. 17. A receipt may be a general document for any undefined accessorial. The related rule set may be based on text such as item, part, receipt, date, time, amount, etc.

In an embodiment, by way of non-limiting example, a rules set for weighting certain text field(s) in a Trailer Control Record can be found at FIG. 18.

In an embodiment, by way of non-limiting example, a rules set for weighting certain text field(s) in a Trailer Interchange Form can be found at FIG. 19.

In an embodiment, by way of non-limiting example, a rules set for weighting certain text field(s) in a Packing Slip can be found at FIG. 20. A packing slip may be a detailed listing/description of the freight. The related rule set may be based on text such as item, part number, pallet, pieces, parts, boxes, cartons, etc.

In an embodiment, by way of non-limiting example, a rules set for weighting certain text field(s) in a Road Repair sheet can be found at FIG. 21. A road repair sheet may document maintenance or repair service. The related rule set may be based on text such as part number, service type, trailer number, driver name or number, date, dollar amount, part number etc.

In an embodiment, by way of non-limiting example, a rules set for weighting certain text field(s) in a Detention sheet can be found at FIG. 22. A detention sheet may provide all essential information necessary to process and invoice the freight shipment with agreed upon detention or waiting fees. The related rule set may be based on text such as detention status, load number, tractor number, trailer number, driver name or number, date, time, etc.

In an embodiment, by way of non-limiting example, a rules set for weighting certain text field(s) in a Citation can be found at FIG. 23. A citation may be a documented infraction, such as a speeding ticket issued by a law enforcement agency. The related rule set may be based on text such as location, infraction, citation, ticket, driver, agency, etc.

A rules set for an invoice can be seen as follows:

Invoice (CINV)

1. "INVOICE" or "Invoice" or "invoice" in the top. [3 points].
2. "TOTAL$" or "Total$" in the bottom. [1 point]. Variations:
   a. Pay this amount$
   b. Invoice Total$
   c. TOTAL DUE$
   d. Total Amount Due$
   e. Balance Due$
   f. Grand Total$
   g. Please pay
3. "INVOICE NUMBER" is in the top. [1 point].
   a. Variations: "Invoice#", "INVOICE#", "Invoice No", "INVOICE NO", "ORIGINAL INVOICE"
4. "INVOICE DATE" is in the top. [1 point].
   a. Variations: "Invoice Date", "INVOICED"
5. "INVOICE" or "Invoice" appears twice in top 2 inches. [1 point].
6. "TERMS" or "Terms" is in the top or bottom. [1 point].
7. "remit to" or "remittance" is in the top or bottom. [1 point].
8. "ORIGINAL INVOICE" or "Original Invoice" is in the bottom. [2 points].

Invoice score>=3 equals invoice if BOL score is <=2.

In addition, by way of non-limiting example, a rules set for weighting certain text field(s) in an invoice can be found at FIG. 6. These rules can be used in conjunction with those above.

Additional rules sets can comprise the following:

TRP (Trip Sheet)
1. If filename contains 1.tif, it is a trip sheet.
   a. 95% of trip sheets are in the first position
   b. Secondary test for trip sheets out of position WGT (Weight Ticket)
1. TICKET NUMBER is in the top
2. THE CAT SCALE GUARANTEE is in the top
3. WEIGH WHAT WE SAY is in the top
4. WEIGHNUMBER is in the bottom
5. WEIGHMASTER OR WEIGHER is in the bottom
6. CUSTOMER COPY is in the bottom LOG
1. If "daily log" or "driver alpha code" is in the top.

MSC
1. If "SALE" is in the top

UNL (Unloading Receipt)
1. If "unloading receipt" or "unloading service receipt" is in the top.

TOL
1. If "turnpike" or "toll" is in the top

RCF (Rate Confirmation/Load Tender Sheet)
1. If the top contains "confirmation", then it can be classified as a confirmation.

The rules and other intelligence and operating functionality disclosed herein can be stored and/or processed at server 140 or servers, client device 270 or client devices, within the network 110 and/or cloud, or in operative communication therewith with any or a combination of these.

For example, a document score or point value may be based upon a weighted scoring system. The weighted scoring system may be based upon one or more keywords, keyword placements, positive phrases, and negative phrases of the document as described herein. A weighted classification mechanism may be applied by testing the document data for predetermined criteria wherein each criterion is assigned a weight, scoring the document based upon a criterion being met, and classifying the document based on the score as described here.

Points can be added together based on the items detected. And, points can be subtracted if certain conditions apply. Then, a final point value can be ascertained. The system can determine whether the document is classifiable based on the score or point value for the document. For example, if the point value is above a certain threshold, there is a reasonably good degree of confidence that the document evaluated is a Bill of Lading. Referring now also to FIGS. 27 and 28, thus, in response to determining that the document is classifiable, the system may classify (2710) (2810) the document as a document type (e.g., Bill of Lading) based upon the score and predefined document classification rules such as those described herein.

The more points, the higher degree of confidence that a document should be classified in a certain manner. In addition, a threshold can be set, above which a document can be deemed to be a certain classification. In this way, the system can determine whether the document is classifiable based on a threshold score or point level. The threshold score or point level may correspond to a level of confidence that the document is classifiable.

By way of non-limiting example, this can apply if there are 9 or more points. In other words, if nine or more points are obtained by this mechanism then the document is considered to be a Bill of Lading with a high degree of confidence. The threshold for a "high degree of confidence" can be set at seven points, or another point value. If a point value of two or fewer points are calculated, the document can be considered unclassifiable and/or additional operations can be performed. Indeed, if below a threshold, a classification can be denied and an exception can be designated, with one result being that the document can be transmitted back to the sender. In this way, the system may determine that the document is unclassifiable based upon the score or point value for the document. Further, in response to determining that the document is unclassifiable the document maybe transmitted back to the sender.

Figure 25:
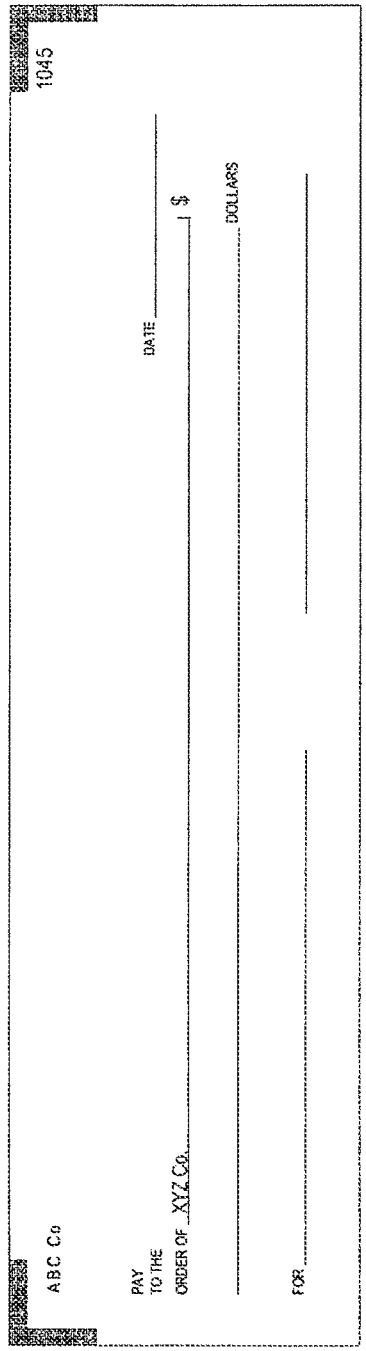
FIG. 25 illustrates an example personal check.

For example, as seen in FIG. 25, if a driver sends an image of a personal check, this image may lack criteria needed to earn a point value above a certain threshold or of a confidence level desired. Thresholds can be set higher or lower depending on the circumstances, including type of document, degree of confidence desired, and other conditions.

Points can be added or deducted based, among other things, on keywords, keyword placement, positive phrases, negative phrases and/or if a threshold is met and a confidence level can be provided, and/or a combination of two or more of the above.

Results can ensue where there is a "moderate" amount of confidence, neither high nor low. These may be treated according to added rules. Indeed, metarules may be developed or derived during the course of evaluating many documents such as to increase or lower degree of confidence, given that conclusions can be drawn from hundreds, thousands, or millions of classification assessments. Thus, metarules may be created based on scoring and classifying multiple documents. The metarules may increase a degree of confidence under which documents are classified and may improve classification accuracy. In other words, the system can learn how to improve classification accuracy by multiple iterations. The routines employed can be customized on behalf of shipper, recipient, or carrier. A metarule may be a specific rule set that may includes keywords, graphics, etc., and can de devised specifically for propriety or customized transportation documents. It may be associated or applied to a specific entity such as a single carrier or shipper as opposed to having the system globally apply across all entities.

Once a document is considered to be classified, added operations can be performed on it, including but not limited to the following: financial information can be derived from it to generate an invoice and perform other accounts receivable procedures; it can be used to begin payment to the driver(s) and other accounts payable procedures; it can be used to route present and future deliveries; it can be used to document successful delivery of goods, transfer of title, etc.; and it can be input into ERP (Enterprise Resource Planning) systems to integrate with added company activities. Efficiency, accuracy, and profitability can improve, with the overall order-to-cash cycle compressed.

Numerous document types can be classified. By way of non-limiting example, these can include the following:

TABLE 1

| | | Asset Side: |
|---|---|---|
| 1. | BOL | Bill of Lading |
| 2. | LOG | Driver Log |
| 3. | LUM | Lumper Receipt |
| 4. | FUL | Fuel Receipt |
| 5. | FMS | Fuel & Mile Sheets |
| 6. | MSC | Miscellaneous |
| 7. | POD | Proof of Delivery |
| 8. | RCF | Rate Confirmation |
| 9. | SCL | Scale Receipt |

TABLE 1-continued

Asset Side:

| 10. | TIR | Trailer Interchange |
| 11. | TOL | Toll Receipt |
| 12. | TRP | Trip Sheet |
| 13. | UNL | Unloading Receipt |
| 14. | WGT | Weight Ticket |

TABLE 2

Brokers:

| 1. | CIN | Carrier Invoice |
| 2. | RCF | Rate Confirmation/Load Tender Sheet |
| 3. | POD | Proof of Delivery |
| 4. | LUM | Lumper Receipt |
| 5. | MSC | Miscellaneous Receipts |
| 6. | TOL | Toll Receipt |
| 7. | WGT | Weight Ticket |
| 8. | CUS | Customs Forms |
| 9. | DET | Detention |
| 10. | J1 | J1 interchanges |

"Unclassified" can also be a document type.

Document conflict rules can be applied to arbitrate the conclusion if inconsistencies are evident. For example, a form with "invoice date" and "invoice number" cannot be a BOL, or this can be deemed to have a low degree of confidence.

Customer-specific rules can be applied. For example, if carriername="XYZ", then doc type=BOL. Customer-specific point values and/or confidence thresholds can be provided. In this way, the values or points assigned to one or more predetermined text fields (e.g., bill of lading, invoice, etc.) and a threshold score may be customer specific. Further, the values assigned one or more predetermined text fields may be customer specific. Thus, the threshold score or values for predetermined text fields may be different for different customers.

Miscellaneous rules can be applied. For example, if a document name is 1.tif, and "trip sheet" is found, then it can be classified as a trip sheet, or this can be deemed so with a high degree of confidence.

Figure 26A:
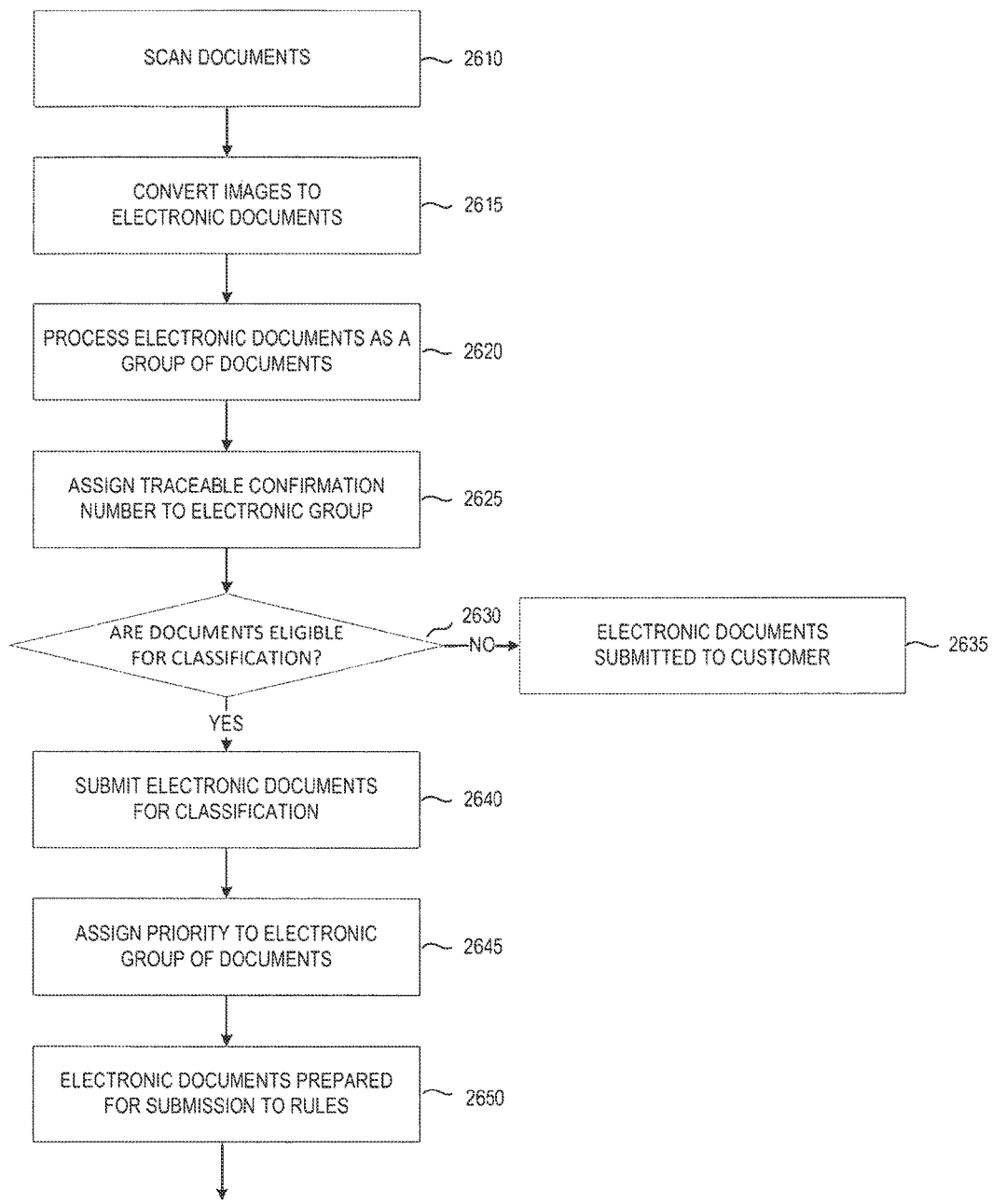
FIGS. 26A and 26B comprise example flowcharts related to various embodiments.
Figure 26B:
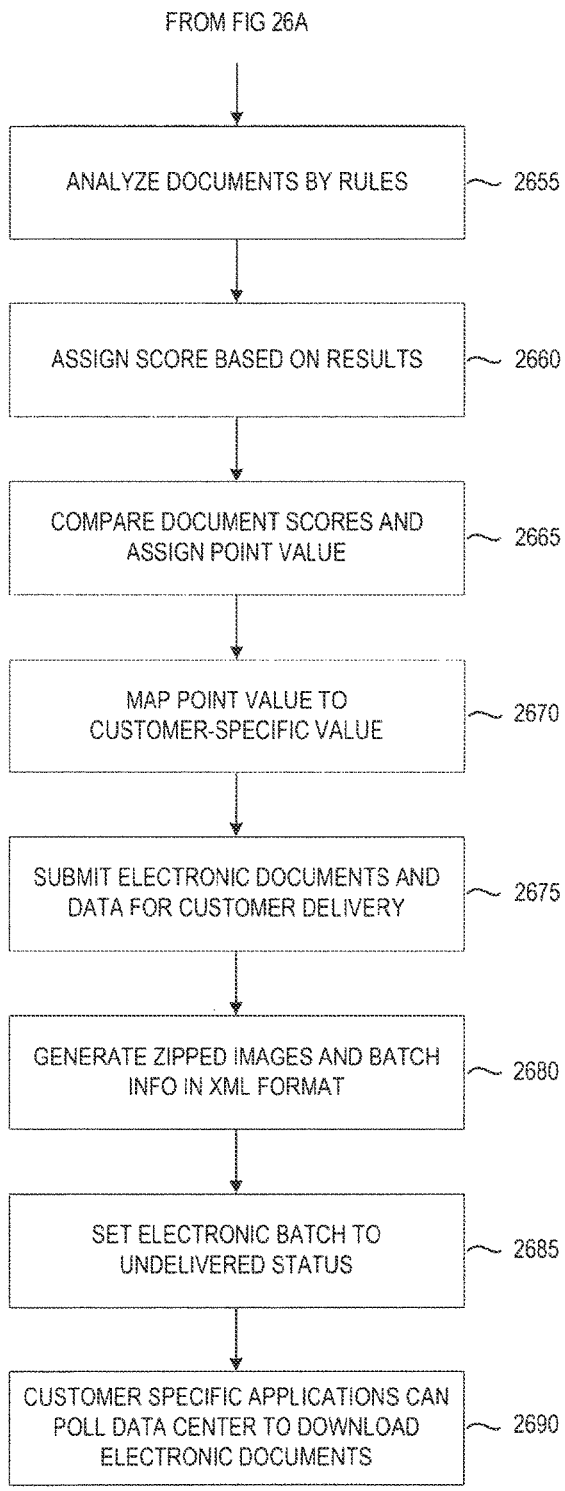

Referring now also to FIGS. 26A and 26B, by way of non-limiting example, in an embodiment, documents can be scanned 2610; such scanning can be remotely such as by a driver, or in another fashion. The images can be converted to electronic documents 2615. The electronic documents can be processed as a group of documents 2620. It will be understood that individual documents, as well as a group, can be submitted, processed and scored. in accord with embodiments. A traceable confirmation number can be assigned by the system to the group 2625. It can be determined if the documents are eligible for classification 2630, such as if a customer has subscribed to the service. If no, then the documents can be submitted to a customer 2635, or the customer otherwise notified. If yes, the documents can be submitted for classification 2640. A priority can be assigned to an electronic group of documents 2645, which can be configured for each customer. Electronic documents can be prepared for submission to rules 2650. Documents can be analyzed based on rules 2655. A score can be assigned based on results 2660. For example, scoring engine module 350 may be configured to assign a score to each of the electronic documents in the group of electronic documents, which may be based upon detecting one or more text phrases in each of the electronic documents as described herein. Document scores can be compared and point values assigned 2665. Point values can be mapped by the system to a customer-specific value 2670 (e.g., customer specific scoring); for example, different customers can have different point value mechanisms, with different weighting, scoring, confidence levels, etc. In an embodiment, rules engine module 370 may classify the electronic documents in the group based on an assigned score for each document in the group, and also based on the customer specific scoring.

The system may transmit the electronic documents to the customers with the document classifications. Electronic documents can be submitted and data prepared for customer delivery 2675. Zipped images can be generated and batch info prepared such as by XML format 2680. An electronic batch can be set to undelivered status 2685. Customer-specific applications can poll a data center to download electronic documents 2690. In accord with embodiments herein, some or all of these steps can occur in an alternate sequence, and some are optional.

In an embodiment, the document classification application may include pattern recognition capability and/or other enhancements including but not limited to an auto-rotate feature and a blank page detector or identifier.

Embodiments can apply to the trucking industry; however, commonalities in logistics and modes of operating other forms of transportation enable embodiments to apply to other forms of transportation as well, including but not limited to rail, air, water, and intermodal transportation documents and communications.

In the preceding specification the present invention has been described with reference to specific example embodiments thereof. It will, however, be evident that various modifications and changes may be made without departing from the broader spirit and scope of the present invention as set forth in the claims that follow. The specification and drawings are accordingly to be regarded in an illustrative rather than restrictive sense.

What is claimed is:

1. A computer-implemented method for classifying documents, the method comprising:
   receiving document data corresponding to a document, at a document classification device, wherein the document data comprises text data;
   detecting, at the document classification device, based on the document data received, an existence of, or an absence of, one or more predetermined text fields in the document based upon, at least in part, the document data;
   assigning, at the document classification device, a value to the one or more predetermined text fields based upon, at least in part, the existence of, or the absence of, the one or more predetermined text fields in the document;
   determining, at the document classification device, a score for the document based upon, at least in part, values assigned to the one or more predetermined text fields; and
   determining, at the document classification device, whether the document is classifiable based upon, at least in part, the score for the document wherein the score is further based on a weighted scoring system, and the weighted scoring system is based upon, at least in part, at least one of: one or more keywords, keyword placements, positive phrases, and negative phrases of the document.

2. A computer-implemented method for classifying documents, the method comprising:

receiving document data corresponding to a document, at a document classification device, wherein the document data comprises text data;

detecting, at the document classification device, based on the document data received, an existence of, or an absence of, one or more predetermined text fields in the document based upon, at least in part, the document data;

assigning, at the document classification device, a value to the one or more predetermined text fields based upon, at least in part, the existence of, or the absence of, the one or more predetermined text fields in the document;

determining, at the document classification device, a score for the document based upon, at least in part, values assigned to the one or more predetermined text fields; and determining, at the document classification device, whether the document is classifiable based upon, at least in part, the score for the document;

applying a weighted classification mechanism by:
- testing the document data for predetermined criteria wherein each criterion is assigned a weight;
- scoring the document based upon a criterion being met; and
- classifying the document based on the score;

comparing the score to scores of other documents; and processing the scores to produce metascores corresponding to an analysis of document data of multiple documents.

3. A computer-implemented method for classifying documents, the method comprising:

receiving document data corresponding to a document, at a document classification device, wherein the document data comprises text data;

detecting, at the document classification device, based on the document data received, an existence of, or an absence of, one or more predetermined text fields in the document based upon, at least in part, the document data;

assigning, at the document classification device, a value to the one or more predetermined text fields based upon, at least in part, the existence of, or the absence of, the one or more predetermined text fields in the document;

determining, at the document classification device, a score for the document based upon, at least in part, values assigned to the one or more predetermined text fields; and determining, at the document classification device, whether the document is classifiable based upon, at least in part, the score for the document; and creating metarules based upon scoring and classifying multiple documents, wherein the metarules increase a degree of confidence under which documents are classified and improve classification accuracy.

* * * * *